United States Patent Office 3,147,257
Patented Sept. 1, 1964

3,147,257
NEW SUBSTITUTED 4-AMINOURACIL DERIVATIVES
Wolfgang Pfleiderer, Stuttgart-Vaihingen, and Günther Strauss, Zell (Neckar), Germany, assignors to Robugen G.m.b.H., Esslingen (Neckar), Germany
No Drawing. Filed Mar. 24, 1959, Ser. No. 801,437
3 Claims. (260—247.2)

This invention relates to new 4-aminouracil derivatives substituted at the uracil nucleus as well as at the same amino group.

4-aminouracil has the formula (1)
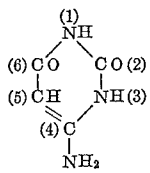

We have discovered that those uracil derivatives which are substituted at the nucleus in at least the 1- and 3-positions, and preferably in the 1-, 3-, and 5-positions and in which the 4-position is occupied by a mono- or di-substituted amino group or by an equally substituted basic nitrogen-containing group show excellent diuretic properties when taken perorally.

The general formula of the new compounds is (2)
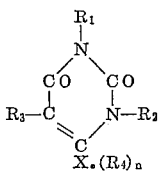

wherein $R_1$ and $R_2$ designate alkyl or alkenyl groups, $R_3$ is hydrogen, an alkyl, alkenyl, aralkyl, or aryl group, and X is an at least mono-substituted basic nitrogen-containing group, i.e., the amino-group, the (N—) morpholino group, or the hydrazo group, the substituent or substituents $(R_4)_n$ of this group X being unsubstituted or substituted alkyl, aryl, or aralkyl radicals; $n$ varies from 1 to the highest number of substitutable hydrogen atoms in X. In the case of X being the amino group $—NH_2$, $n$ is equal to 2.

More particularly, among these new substances, 1,3-dimethyl-4-methylaminouracil is an excellent diuretic, being in the form of small, thin, colorless prismatic needles having a melting point of 242 to 243° C. Its structural formula is:

(3)
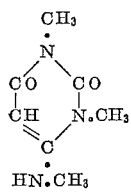

Corresponding to its empirical formula $C_7H_{11}O_2N_3$, it was to be expected that this substance would contain 49.60% of C, 6.50% of H, and 24.90% of N. Accordingly, an analysis of the product according to the invention showed a carbon content of 49.74%, 6.60% of hydrogen, and a nitrogen content of 25.21%.

1,3,5-trimethyl-4-benzylaminouracil is another one of the new substances according to the invention. It consists of fine, colorless needles having a melting point of 100 to 102° C., and its structural formula is (4)
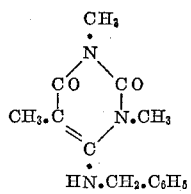

According to its empirical formula $C_{14}H_{17}N_3O_2$, it is expected to contain 64.84% C, 6.61% H, 16.21% N. Analysis of our product revealed the following composition: 64.72% C, 6.52% H, 16.15% N.

Yet another new uracil derivative is 1,3,5-trimethyl-4-(N—)-morpholinouracil, consisting of fine, yellow needles, and having a melting point of 160 to 161° C. Its structural formula is (5)
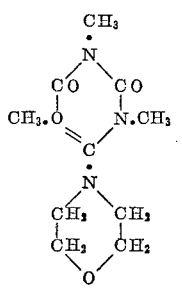

From its empirical formula $C_{11}H_{17}N_3O_3$, the following contents of C, H, and N were calculated: 55.21% of C, 7.18% of H, 17.55% of N. Analysis of our product showed the following contents: 55.18% of C, 7.12% of H, 16.86% of N.

The alkyl groups which may constitute the substituents $R_1$, $R_2$, $R_3$ and/or $R_4$ may have from 1 to 6 and probably even a few more carbon atoms per molecule in the case of normal chains, and up to 10 and probably one or two more carbon atoms in the case of branched chains. The preferred groups are the methyl, ethyl, propyl and isopropyl radicals; the cyclohexyl radical may also be introduced.

The alkenyl groups which may constitute the substituents $R_1$, $R_2$, and/or $R_3$ may have from 2 to about 10 carbon atoms per molecule. A preferred alkenyl radical is the allyl (propenyl) radical

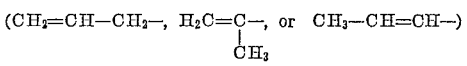

Aralkyl groups constituting the substituents $R_1$, $R_2$, $R_3$ and/or $R_4$ may have from 7 to 10 carbon atoms per molecule. A preferred aralkyl radical is the benzyl group $—CH_2.C_6H_5$.

Aryl groups constituting the substituents $R_1$, $R_2$, $R_3$ and/or $R_4$ should be benzene derivatives, i.e., have six carbon atoms in the nucleus, and may contain from 6 to about 10 carbon atoms per aryl radical, such as

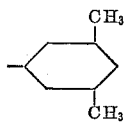

with 8 carbon atoms per radical; a preferred radical is $C_6H_5-$.

The mono-, di-, or higher substituted "basic nitrogen containing" groups represented by X in the general formulas shown in this application are constituted by the amino-group

and substitution groups of the same such as the morpholino group

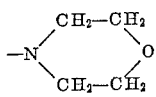

the piperidine, piperazine and pyrrolidine group. Preferred groups are the amino and the morpholino radicals.

The production of 1,3- and 1,3,5-substituted 4-aminouracils with amono- or disubstituted amino-group has obviously not been possible in the past. The German Patent 938,846 to Geigy describes a process for making 4-amino-uracil by a condensation reaction according to the following equation:

(6) 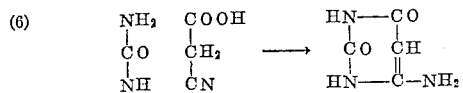

However it was not possible to obtain in this manner $NHR$ or $NR_2$ or similar N-substituted 4-amino derivatives of the above compound.

In the process according to our invention, we use as the starting material for the production of a desired new compound of the aforesaid type the corresponding 4-chloro compound. But for this purpose it is necessary to produce this 4-chloro compound with economically satisfactory yields.

In so far as attempts have been made in the art to chlorinate the 4-position of alkylbarbituric acids, preferably those alkylated in 5-position, with the aid of $POCl_3$, they must have had a negative result. At least we did not find any publication describing such a successful chlorination with $POCl_3$.

1,3-dimethyl-4-chlorouracil was produced by Bergmann and Heimhold, with a low yield and not with $POCl_3$, but by the rearrangement reaction of 4-chloro-2,6-dimethoxypyrimidine with methyl iodide according to the equation (7) 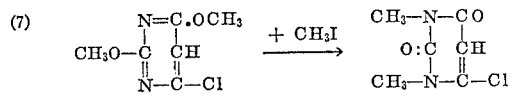

The process, according to our invention, of producing new 4-amino-uracil derivatives is made possible due to the fact that 4-chlorinated uracil derivatives are now readily available, owing to the discovery of one of us that the 4-position of alkyl-barbituric acids, and in particular of those alkylated in 1- and 3- or in 1-3- and 5-position can be chlorinated successfully with $POCl_3$ at a very satisfactory yield in the order of 80% and higher, if the phosphorus oxychloride is not used substantially water-free, as has obviously been customary in the art, but if instead $POCl_3$ is used together with a certain amount of water, for instance in the order of 2 to 5% by weight of the amount of $POCl_3$ used. The water is conveniently admixed to the alkyl barbituric acid, and $POCl_3$ is then added to the mixture. The presence of water in the latter leads to the formation of a chlorinating mixture of $POCl_3$, HCl and several phosphoric and phosphorous acids, and Pfleiderer et al., infra, believe that it is this chlorinating mixture which leads to the unexpectedly high yield of the 4-chloro compounds. The preparation of 1,3-dimethyl-4-chlorouracil was reported by one of us, W. Pfleiderer, together with Schindehütte, in "Annalen der Chemie," 1958, 612, pages 158–163.

Now, we have found that the mono-N- or di-N-substituted amino derivatives of 4-amino-uracil, and which are referred to hereinafter and in the claims as "basic nitrogen-containing radicals groups or compounds," can be obtained from the corresponding intermediary 4-chloro compounds by reaction with the corresponding mono- or di-N-substituted aminos. We have also found that annulated substances containing a di-substituted nitrogen atom, i.e., a nitrogen atom participating in the ring, are equably suitable for this second step of the process according to our invention and are comprised under the term "di-substituted amino compound" as used in this application. Such annulated substances are morpholine, piperidine, piperazine, and pyrrolidine.

Mono-substituted amino derivatives suitable for use in the second stage of the process according to the invention are hydrazine and mono-, di- and tri-substituted derivatives of hydrazine.

The above-described products and similar 4-amino, 4-morpholino- and 4-hydrazouracil derivatives, i.e., 1,3- or 1,3,5-substituted 4-amino uracils in which the amino group is substituted for instance as follows:

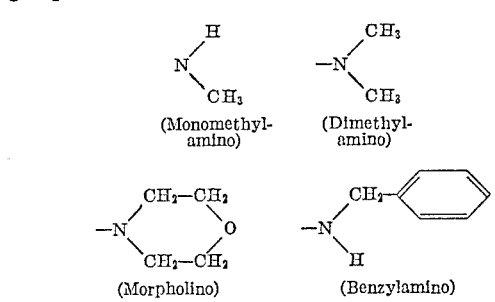

(Monomethyl-amino) (Dimethyl-amino)

(Morpholino) (Benzylamino)

can be obtained according to the process of our invention by using as starting materials 1,3-disubstituted or 1,3,5-trisubstituted barbituric acids having the general formula:

(8) 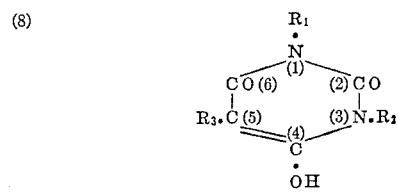

and in which $R_1$, $R_2$, and $R_3$ are defined as above in Formula 2.

The starting material is first treated as described by Pfleiderer et al. supra with phosphorus oxychloride, $POCl_3$, under addition of small amounts of water and heating under a reflux condenser, whereby a reaction takes place under the effect of HCl and phosphorus-based acids, in particular phosphorous and phosphoric acid, formed from $POCl_3$, which reaction leads to the formation of the corresponding 1,3-disubstituted or 1,3,5-trisubstituted 4-chlorouracil having the general formula:

(9) 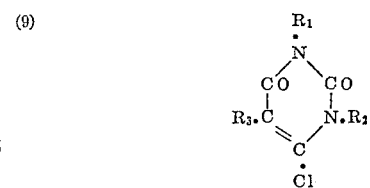

These chlorinated intermediary products are obtained in good yields, and can then be caused to react easily with mono-, di- or higher-substituted basic, nitrogen-containing compounds of the general formula $H.X(R_4)_n$ in which X, $R_4$, $n$ have been defined above, and of which the preferred substances are alkyl-, aryl-, or aralkyl-amines, and the corresponding morpholine and hydrazine derivatives. This second step of the process according to the invention leads to the formation of the new uracil derivatives, having the general Formula 2, according to the equation:

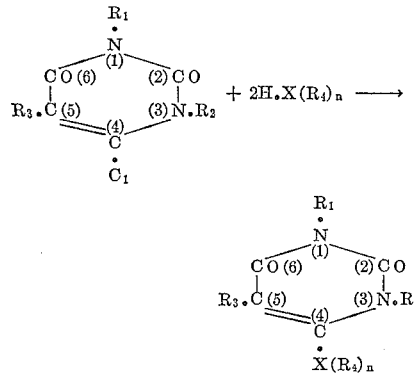

The process according to the invention will be further illustrated by a number of examples given below, which are, however, not meant to be limitative in any way.

EXAMPLE I

As the first step in the process according to the invention in order to prepare the starting material in the manner described by Pfleiderer et al., supra, in "Annalen der Chemie," 20 grams (g.) of 1,3-dimethylbarbituric acid obtained as described by A. C. Cope et al. in J. Am. Chem. Soc., 1941, 63, page 357, are stirred with 5 milliliters (ml.) of water to obtain a crystal slurry and then heated in a suitable round-bottom flask or similar reaction vessel under a reflux condenser while adding to the slurry, through the condenser, about 200 g. of $POCl_3$ in small batches. The mixture is caused to boil for about half an hour, whereupon between 100 and 150 ml. of $POCl_3$ are distilled off and the sirupy residue is carefully poured on to about 100 g. of crushed ice under stirring of the resulting mixture, and gradually decomposed therein.

The resulting yellow aqueous solution is extracted by partitioning three times with about 200 ccs. of chloroform in a separating funnel. The chloroform extract is dried with anhydrous calcium chloride, and the 4-chlorouracil contained therein is isolated by evaporating the solvent at 80° C. on a water bath.

The resulting yellowish crystal mass is purified by recrystallization, in a conventional manner, from water with the aid of active carbon.

The purified intermediary product is obtained in a yield of 20 g. which corresponds to 89% of the theoretical amount, and has a melting point of 110 to 111° C.

10 g. of 1,3-dimethyl-4-chlorouracil obtained according to the above-described first stage are then brought, according to the second stage in the process according to our invention, into a reaction vessel, and 30 ml. of a 40% weight-volume solution of methylamine in water is added thereto. After a short time, the reaction starts either spontaneously or after lightly warming the mixture, which then solidifies to a crystal pulp. Water is suction-filtered off and the residue washed with a few ml. of cold water (about 15° C. or less). The washed crystals are recrystallized from water, and the desired 1,3-dimethyl-4-methylaminouracil is obtained as fine, colorless needles having a melting point of 242 to 243° C. The yield is 9.0 g. or about 91% of the theoretical amount.

Its properties have been described hereinbefore.

EXAMPLE II

In a 500 ml. round-bottom flask provided with a reflux condenser, 44 g. of 1,3,5-trimethylbarbituric acid are mixed with 13.5 g. of water and 350 g. of $POCl_3$ in the same manner as described in the previous example, and the reaction is brought about by heating the contents of the flask to boiling for about one hour.

The excess of $POCl_3$ is then distilled off by evaporation below 100° C. under reduced pressure of about 20 torr.

The sirupy, still warm residue is poured from the flask on to about 200 g. of ice under stirring, whereby a white crystal slurry is quickly formed. After permitting the pulp to cool to about room temperature, the mother liquor is suctioned off and the crystalline residue is washed with cold water.

A further portion of the resulting intermediary chlorinated product can be obtained by extracting the mother liquor with chloroform in the same manner as described in the preceding example. After recrystallization in water, about 43.3 g. of 1,3,5-trimethyl-4-chlorouracil are obtained in the form of thin white needles having a melting point of 135 to 136° C. This amount corresponds to about 88.5% of the theoretically expected yield.

Analysis results of this product are tabulated below in percent by weight:

|  | C | H | N |
|---|---|---|---|
| Calculated | 44.57 | 4.81 | 14.85 |
| Found | 44.65 | 4.72 | 15.01 |

In the second stage of the process according to the invention, 3.8 g. of the aforesaid intermediary product are mixed with 4.6 g. of benzylamine in a flask provided with a riser tube, and heated carefully on a waterbath until the reaction sets in which is visible by the solidification of the initially clear solution to a crystal slurry or pulp. This reaction is complete after about 2.5 hours. After cooling, 50 ml. of water are added under stirring and the mixture is permitted to settle. The crystalline part is dissolved in the water and two layers separate, the lower of which is constituted by a heavy oil. This oil crystallizes after some time and is separated from the mother liquor by suctioning off the latter. The resulting crystalline residue is rinsed with cold water. The substance is then preferably purified by dissolution in a small amount of ethanol and precipitated from the resulting solution in the form of fine, small needles by adding water. 4.2 g. of crystals of the desired 1,3,5-trimethyl-4-benzylaminouracil having a melting point of 102° C. are obtained which corresponds to 83% of the theoretical yield.

Analysis results are tabulated below in percent by weight:

|  | C | H | N |
|---|---|---|---|
| Calculated | 64.84 | 6.61 | 16.21 |
| Found | 65.50 | 6.52 | 16.40 |

EXAMPLE III

The first stage of the process according to the invention is repeated as described in Example II. 3,8 g. of the resulting 1,3,5-trimethyl-4-chlorouracil are then mixed in a flask provided with a reflux condenser with 4.1 g. of morpholine and the mixture is boiled for 5 to 6 hours. After cooling to room temperature, the yellow solution solidifies to form a crystal pulp, from which the mother liquor is seprated by suction filtration, and the end product recrystallized from about 20 to 25 ml. of water. 3.8 g. of the desired 1,3,5-trimethyl-4-(N—)morpholinouracil having a melting point of 160 to 161° C. are obtained in the form of prismatic crystals.

The aforesaid amount corresponds to 78% of the theoretical yield.

Analysis results of the final product are tabulated below in percent by weight:

|  | C | H | N |
|---|---|---|---|
| Calculated | 55.21 | 7.16 | 17.55 |
| Found | 55.18 | 7.12 | 16.86 |

EXAMPLE IV 1,3-dimethyl-5-ethyl-4-chlorouracil is prepared according to the method by Pfleiderer supra as described in Example II, starting from the corresponding barbituric acid derivative. This substance crystallizes in needles having a melting point of 70° C.

20.2 grams of this intermediary product are heated with 59 grams of isopropylamine and 100 ml. of ethanol having a concentration of 95% for 15 hours in an autoclave at about 120° C. After cooling, the solution is filtered and the filtrate concentrated to dryness on a water bath and under moderate vacuum.

The resulting uracil derivative can be recrystallized from 200 ml. of a mixture of 1 part by volume of ethanol with 3 parts of water, with the use of absorptive carbon in the conventional manner. The final product is 1,3-dimethyl-5-ethyl-4-isopropylaminouracil, forms beautiful rhombic prismatic crystals, and melts at 135 to 136° C. The yield is 16.1 grams. Analysis results are tabulated below in percent by weight:

|  | C | H | N |
|---|---|---|---|
| Calculated | 58.64 | 8.50 | 18.65 |
| Found | 58.63 | 8.36 | 18.41 |

EXAMPLE V 1,3,5-trimethyl-4-chlorouracil is prepared as described in Example II.

5.0 g. of this substance are heated with 30 ml. of an aqueous 40% weight/volume ethylamine solution in an autoclave for 2 hours at 100° C. The reaction mixture is filtered and the filtrate is concentrated on a water bath to dryness until no further loss of weight takes place. The dry product is redissolved in 100 ml. of water and the aqueous solution is thus extracted in a conventional perforator with diethyl ether. After evaporating the ether an oily residue is obtained which is dissolved in ethyl acetate and precipitated from the latter by adding slowly petroleum ether. About 3.7 g. of 1,3,5-trimethyl-4-ethylaminouracil are isolated in the form of transparent, colorless rectangular prisms having a melting point of 103° C.

Analysis results of this final product are given below in percent by weight:

|  | C | H | N |
|---|---|---|---|
| Calculated | 54.80 | 7.67 | 21.29 |
| Found | 54.90 | 7.51 | 20.63 |

EXAMPLE VI 1,3-diphenyl-5-methyl-4-chlorouracil is used as the starting material obtained from the corresponding barbituric acid derivative in a manner similar to that described in Example II. This 4-chlorouracil derivative consists of fine, white needles when crystallized from ethanol/water purification similar to that described in Example IV; its melting point is 171° C. and analysis results are the following:

|  | C | H | N | Cl |
|---|---|---|---|---|
| Calculated | 65.28 | 4.19 | 8.96 | 11.34 |
| Found | 65.33 | 4.29 | 8.81 | 10.56 | all in percent by weight.

3.12 g. of this substance are heated with 26 g. of morpholine in an autoclave for 6 hours at 150° C. The resulting yellowish solution is strongly concentrated by heating on the water bath at moderate vacuum (50 torr.). The resulting syrup begins slowly to crystallize. While still hot, the crystal mass is then dissolved in 25 ml. of ethanol and filtered hot. Soon, as the solution cools, small needles begin to crystallize.

About 2.0 g. of 1,3-diphenyl-5-methyl-4-morpholinouracil are obtained. After recrystallizating the substance twice in the manner described in Example IV, it shows a melting point of 196° C. Analysis results as tabulated below are given in percent by weight:

|  | C | H | N |
|---|---|---|---|
| Calculated | 69.40 | 5.83 | 11.57 |
| Found | 69.59 | 5.83 | 11.74 |

In a similar manner a great variety of new substances have been produced all of which correspond to the general Formula 2 supra. The characteristic groups of the substances described above and several others obtained in a similar manner, are indicated together with the melting points of these substances in the Table I below:

*Table I*

| Example No. | $R_1$ | $R_2$ | $R_3$ | $X-R_4$ | M.P. in ° C. (d=decomposed) |
|---|---|---|---|---|---|
| I | $CH_3$ | $CH_3$ | H | $-NHCH_3$ | 242-243 |
| II | $CH_3$ | $CH_3$ | $CH_3$ | $-NH$-benzyl | 102 |
| III | $CH_3$ | $CH_3$ | $CH_3$ | $-$morpholino | 161 |
| IV | $CH_3$ | $CH_3$ | $C_2H_5$ | $-NH$-iso-$C_3H_7$ | 136 |
| V | $CH_3$ | $CH_3$ | $CH_3$ | $-NH-C_2H_5$ | 103 |
| VI | $C_6H_5$ | $C_6H_5$ | $CH_3$ | $-$morpholino | 196 |
| VII | $CH_3$ | $CH_3$ | $CH_3$ | $-NH-CH_3$ | 162 |
| VIII | $CH_3$ | $CH_3$ | $CH_3$ | $-NH-C_2H_4OH$ | 164 |
| IX | $CH_3$ | $CH_3$ | $CH_3$ | $-NH$-iso-$C_3H_7$ | 123 |
| X | $CH_3$ | $CH_3$ | $C_2H_5$ | $-NH-CH_3$ | 165 |
| XI | $CH_3$ | $CH_3$ | $C_2H_5$ | $-NH-C_2H_5$ | 118 |
| XII | $CH_3$ | $CH_3$ | iso-$C_3H_7$ | $-NH-CH_3$ | 86-88 |
| XIII | $CH_3$ | $CH_3$ | $CH_3$ | $-NH-NH_2$ | 174-176 |
| XIV | $CH_3$ | $CH_3$ | $CH_3$ | $-N(CH_3)_2$ | 78-79 |
| XV | $CH_3$ | $CH_3$ | Cyclohexyl | $-NH.CH_3$ | 126-128 |
| XVI | $CH_3$ | $CH_3$ | $C_6H_5$ | $-NH.CH_3$ | 255 |
| XVII | $CH_3$ | $CH_3$ | $C_6H_5$ | $-NH-C_2H_5$ | 166-167 |

We have further discovered from pharmacological tests that these new substances show interesting, favorable effects of the type exerted by theophyllin and/or caffein. Some of these compounds exceed these effects as found in their prototype considerably, while having a low toxicity.

It is a special advantage of the compounds that most of them are easily soluble in water and may, therefore, be used therapeutically without an intermediary dissolving agent.

A new substance according to the invention which particularly exceeds theophyllin in its specific effects, is 1,3-dimethyl-5-ethyl-4-methylaminouracil. Its diuretic effect and the increase which it causes in the rate of blood circulation through the capillary blood vessels are compared with similar effects caused by theophyllin.

(1) DIURETIC EFFECT

Amount applied: 25 milligrams per kilogram of a rat as test animal.

Effect after 8 hours: Percent increase
Theophyllin _____ 115
1,3-dimethyl-5-ethyl-4-methylaminouracil _____ 126

(2) INCREASE OF RATE OF BLOOD CIRCULATION THROUGH THE CAPILLARY BLOOD VESSELS (a) 10 milligrams: Percent increase
Theophyllin _____ 184
1,3-dimethyl-5-ethyl-4-methylaminouracil _____ 220
(b) 1 milligram:
Theophyllin _____ 195
1,3-dimethyl-5-ethyl-4-methylaminouracil _____ 110

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

What is claimed is:

1. A compound of the formula

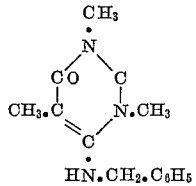

2. A compound of the formula

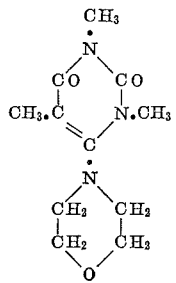

3. A compound of the formula

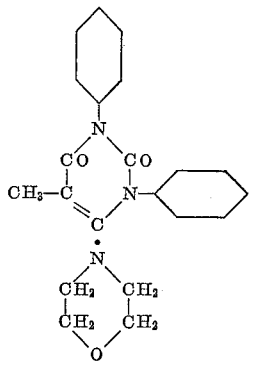

References Cited in the file of this patent
UNITED STATES PATENTS
2,567,651     Papesch et al. _____ Sept. 11, 1951

OTHER REFERENCES

Feiser et al.: Organic Chemistry, pp. 220–226, 2nd Ed., 1950.

Phillips: Jour. Amer. Chem. Soc., vol. 73, pp. 1061–1062, 1951.

Pfleiderer et al.: Annalen der Chemie, vol. 612, pp. 158–163, January 27, 1958.

Pfleiderer et al.: Annalen der Chemie, vol. 615, pp. 52–56, October 1, 1958.